(12) United States Patent
Lavery et al.

(10) Patent No.: US 6,482,255 B1
(45) Date of Patent: Nov. 19, 2002

(54) DISAZODYES FOR INK JET PRINTING

(75) Inventors: Aidan Joseph Lavery, High Wycombe (GB); Colin Dick Robertson, Grangemouth (GB); Janette Watkinson, Manchester (GB); Kathryn Carr, Manchester (GB); Paul Wight, Manchester (GB)

(73) Assignee: Avecia Limited, Manchester (GB)

( * ) Notice: Subject to any disclaimer, the term of this patent is extended or adjusted under 35 U.S.C. 154(b) by 0 days.

(21) Appl. No.: 09/529,810

(22) PCT Filed: Oct. 2, 1998

(86) PCT No.: PCT/GB98/02971

§ 371 (c)(1),
(2), (4) Date: Jun. 26, 2000

(87) PCT Pub. No.: WO99/21922

PCT Pub. Date: May 6, 1997

(30) Foreign Application Priority Data

Oct. 24, 1997 (GB) ................................................ 9722396
Dec. 19, 1997 (GB) ................................................ 9726812

(51) Int. Cl.$^7$ .................. C09D 11/02; C09B 29/09; B05D 1/26; B32B 3/00; B32B 27/14
(52) U.S. Cl. ...................... 106/31.48; 106/31.77; 534/797; 8/639; 427/466; 428/195
(58) Field of Search .................. 106/31.48, 31.77; 534/797; 8/639; 427/466; 428/195

(56) References Cited

U.S. PATENT DOCUMENTS

| | | | |
|---|---|---|---|
| 4,082,739 A | 4/1978 | Seitz | 534/634 |
| 4,866,163 A | * 9/1989 | Koch | 534/583 |
| 5,320,648 A | * 6/1994 | McMullan et al. | 8/543 |
| 5,631,352 A | * 5/1997 | Lauk | 534/573 |

FOREIGN PATENT DOCUMENTS

| | | |
|---|---|---|
| DE | 2 203 615 | 5/1973 |
| DE | 32 44 999 A1 | 6/1983 |
| EP | 0 549 529 A1 | 6/1993 |
| EP | 0 693 538 A2 | 1/1996 |

* cited by examiner

*Primary Examiner*—Helene Klemanski
(74) *Attorney, Agent, or Firm*—Pillsbury Winthrop LLP

(57) ABSTRACT

Compounds of the Formula (1) and salts thereof:

Formula (1)

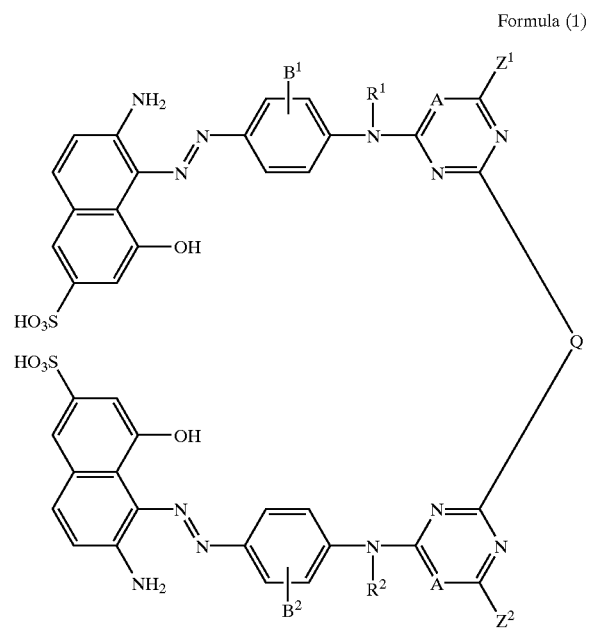

wherein $B^1$, $B^2$, Q, $R^1$, $R^2$, A, $Z^1$ and $Z^2$ are defined in the description. Also claimed are compositions containing two or more compounds of the Formula (1), inks containing the compounds and compositions, an ink jet printing process using the inks, a substrate printed with the inks, and an ink jet printer cartridge containing an ink containing a compound of the Formula (1).

28 Claims, No Drawings

DISAZODYES FOR INK JET PRINTING

This application is the national phase of international application PCT/GB98/02971 filed Oct. 2, 1998 which designated the U.S.

This invention relates to dyes, to inks, to compositions and to their use in ink jet printing ("IJP"). IJP is a non-impact printing technique in which droplets of ink are ejected through a fine nozzle onto a substrate without bringing the nozzle into contact with the substrate.

There are many demanding performance requirements for dyes and inks used in IJP. For example they desirably provide sharp, non-feathered images having good waterfastness, light-fastness and optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle.

According to the present invention there is provided a compound of Formula (1) and salts thereof:

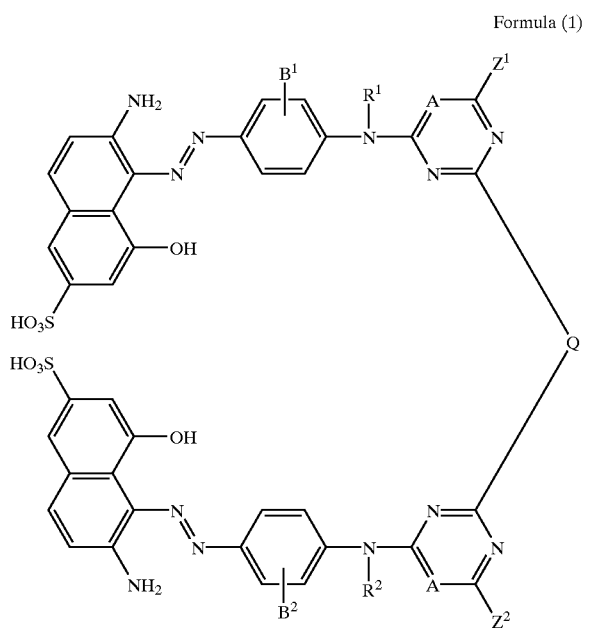

Formula (1)

wherein:

$B^1$ and $B^2$ are each independently —$SO_3H$, —COOH, —$CF_3$, optionally substituted alkoxy, optionally substituted alkyl or —$PO_3H_2$;

Q is an organic linking group;

$R^1$ and $R^2$ are each independently H or optionally substituted alkyl;

each A independently is N, C—Cl, C—CN or C—$NO_2$;

$Z^1$ and $Z^2$ are each independently —$SR^3$, —$OR^4$, —$NR^5R^6$ or halogen;

$R^3$, $R^4$, $R^5$ & $R^6$ are each independently H, optionally substituted alkyl, optionally substituted aryl or optionally substituted aralkyl; or $R^5$ and $R^6$ together with the nitrogen to which they are attached form an optionally substituted five or six membered ring;

provided that Q is not of the formula:

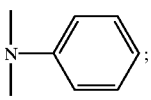

$B^1$ and $B^2$ are preferably attached ortho to the azo group. It is also preferred that $B^1$ and $B^2$ are each independently —$SO_3H$, —COOH, —$CF_3$, optionally substituted $C_{1-4}$-alkoxy, optionally substituted $C_{1-4}$-alkyl or —$PO_3H_2$, more preferably —$SO_3H$, —COOH or —$CF_3$ and especially —$SO_3H$. When $B^1$ or $B^2$ is substituted, the substituent(s) is/are preferably selected from —OH, —$SO_3H$, —COOH, —$NH_2$, $C_{1-4}$-hydroxyalkyl, $C_{1-4}$-hydroxyalkoxy and $C_{1-4}$-alkoxy.

Preferably each A is N.

Preferably $R^1$ and $R^2$ are each independently H or optionally substituted $C_{1-4}$-alkyl, more preferably H or $C_{1-4}$-alkyl optionally substituted by hydroxy, carboxy, sulpho or cyano. It is especially preferred that $R^1$ and $R^2$ are methyl or H, more especially H.

The organic linking group Q is preferably an optionally substituted piperazinylene group, or a group of the formula —$X^1$—L—$X^2$— wherein $X^1$ and $X^2$ are each independently an optionally substituted piperazinylene group, —S—, —O— or —$NR^7$— wherein $R^7$ is H, optionally substituted alkyl or optionally substituted aryl, and L is a divalent organic linking group.

Preferably $R^7$ is H, $C_{1-4}$-alkyl or —$C_{1-4}$-hydroxyalkyl, more preferably H or methyl, especially H.

Preferred divalent organic linking groups represented by L are alkylene, preferably $C_{1-20}$-alkylene, more preferably $C_{2-10}$-alkylene, each of which is optionally interrupted; alkenylene, preferably $C_{2-6}$-alkenylene; arylene, preferably arylene containing up to ten carbon atoms, more preferably phenylene or naphthylene, especially 1,3- or 1,2-phenylene; aralkylene, more preferably $C_{7-10}$-aralkylene, especially phenylene-$C_{1-6}$-alkylene more especially -phenylene-$CH_2$—; and two arylene groups joined together either directly or through a vinyl, oxygen, nitrogen or sulphur link; each of the above divalent organic linking groups may be substituted or unsubstituted.

The optional substituent(s) on L are preferably selected from alkyl optionally substituted by hydroxy, carboxy or sulpho, preferably hydroxy-$C_{1-4}$-alkyl, carboxy-$C_{1-4}$-alkyl or sulpho-$C_{1-4}$-alkyl; alkoxy, preferably $C_{1-4}$-alkoxy and especially methoxy; phenyl optionally substituted by $C_{1-4}$alkyl, carboxy, hydroxy, sulpho, amino or nitro; halo, preferably F or Cl; —$SO_3H$; —COOH; —OH; —CN; or —$NO_2$.

When L is an alkylene group it is preferably $C_{210}$-alkylene optionally interrupted by —O—; —S—; optionally substituted arylene, especially optionally substituted phenylene; —$NR^8$—; —C(O)—; —CO(O)—; or an optionally substituted piperazinylene group, wherein $R^8$ is H, $C_{1-4}$-alkyl, or —$C_{1-4}$-hydroxyalkyl, more preferably H. When the interrupting group is a substituted piperazinylene group it is preferably substituted by $C_{1-6}$-alkyl optionally substituted by hydroxy, carboxy or sulpho.

An especially preferred interrupted alkylene group is of the formula:

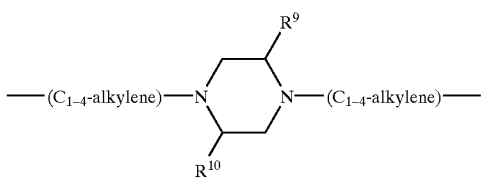

wherein:
R$^9$ and R$^{10}$ each independently is H or C$_{1-4}$-alkyl optionally substituted by hydroxy, sulpho or carboxy.

Preferably R$^9$ and R$^{10}$ are H.

Examples of optionally substituted alkylene and alkenylene groups represented by L include: ethylene; 1,2- & 1,3-propylene; 2-hydroxy-1,3-propylene; 1-, & 2-phenyl-1,3-propylene; 1,4-, 2,3- and 2,4-butylene; 2-methyl-1,3-propylene; 2-(4'-sulphophenyl)-1,3-propylene; 2-methyl-2,4-pentylene; 2,2-dimethyl-1,3-propylene; 1-chloro-2,3-propylene; 1,6- & 1,5-hexylene; 1-carboxy-ethylene 1-carboxy-1,5-pentylene; 2,7-heptylene; 3-methyl-1,6-hexylene; —CH$_2$CH=CHCH$_2$— and 1-(methoxycarbonyl)-1,5-pentylene.

Examples of optionally interrupted alkylene groups represented by L include —CH$_2$NHCH$_2$—; —CH$_2$CH$_2$OCH$_2$CH$_2$—; —(CH$_2$)$_3$O(CH$_2$)$_2$O(CH$_2$)OCH$_2$OCH$_2$—; —CH$_2$CH$_2$SCH$_2$CH$_2$—; o-, m- and p-xylylene and

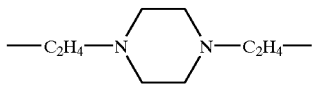

A preferred aralkyl group represented by L is of the Formula (2):

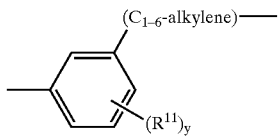

Formula (2)

wherein:
each R$^{11}$ independently is H, C$_{1-4}$-alkoxy, F, Cl, —SO$_3$H, —COOH, —OH, —CN, —NO$_2$ or C$_{1-4}$-alkyl optionally substituted by —OH, —COOH or —SO$_3$H; and
y is 1 to 4.

Preferably y is 1, 2 or 3, more preferably 1.

We have found that compounds wherein L is of the Formula (2) exhibit a high solubility in aqueous media and when incorporated into an ink, the ink exhibits very good operability in ink jet printers.

Examples of preferred arylene and aralkylene groups include —C$_6$H$_4$—CH$_2$—, —C$_6$H$_4$—CH$_2$CH$_2$—, 1,2-, 1,3- and 1,4-phenylene and 1,4-naphthylene.

When L is two arylene groups joined together directly it is preferably an optionally substituted biphenylene group, more preferably optionally substituted 4,4'-biphenylene.

When L is a two arylene groups joined by a divalent linking group it is preferably two of the hereinbefore defined arylene groups (especially optionally substituted phenylene) joined together by a linking group selected from —O—, —S—, —NR$^8$—, —CH=CH— and C$_{2-6}$-alkylene optionally interrupted by —O—, —S— or —NR$^8$—, wherein R$^8$ is as hereinbefore defined. Examples of two arylene groups joined by a divalent linking group include diphen-4,4'-ylene-methane, —C$_6$H$_4$—CH$_2$CH$_2$—C$_6$H$_4$—, —C$_6$H$_4$—CH=CH—C$_6$H$_4$—, —C$_6$H$_4$—O—C$_6$H$_4$—, —C$_6$H$_4$—S—C$_6$H$_4$— and —C$_6$H$_4$—NHCH$_2$—C$_6$H$_4$—.

When Q, X$^1$ or X$^2$ is an optionally substituted piperazinylene group it is preferably of the Formula (3):

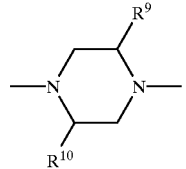

Formula (3)

wherein R$^9$ and R$^{10}$ are each independently as hereinbefore defined.

Where one or both of X$^1$ and X$^2$ is an optionally substituted piperazinylene group, Q (i. e. the group X$^1$LX$^2$—) is preferably one of the following formulae:

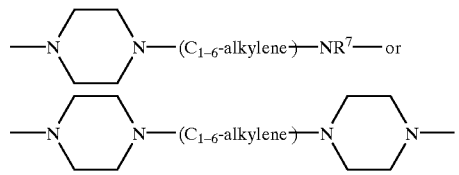

wherein R$^7$ is as hereinbefore defined.

In a preferred embodiment Q is an optionally substituted piperazinylene group or Q is a group of the formula —X$^1$—L—X$^2$— wherein X$^1$ and X$^2$ are each independently selected from optionally substituted piperazinylene, —S— or —NR$^7$— wherein R$^7$ is as hereinbefore defined; and L is a group of Formula (2), 1,3-phenylene, or C$_{2-6}$-alkylene optionally interrupted by —O—, —S—, phenylene, —NR$^8$—, —C(O)—, —CO(O)— or an optionally substituted piperazinylene group, wherein R$^8$ is as hereinbefore defined. In this embodiment preferred optionally substituted piperazinylene groups are of Formula (3).

When R$^3$, R$^4$, R$^5$, R$^6$ or R$^7$ is optionally substituted alkyl it is preferably optionally substituted C$_{1-20}$-alkyl, more preferably optionally substituted C$_{1-4}$-alkyl and especially optionally substituted C$_{1-6}$-alkyl. Preferred optional substituents include hydroxy, carboxy, sulpho, —PO$_3$H$_2$, cyano, a 5 or 6 membered heterocyclic group and optionally substituted amino. Preferred 5 or 6 membered heterocyclic groups are optionally substituted furanyl and tetrahydrofuranyl, more preferably furanyl and tetrahydrofuranyl optionally substituted by —COOH or —SO$_3$H.

Preferred optionally substituted amino groups which may be present on the alkyl groups represented by R$^3$, R$^4$, R$^5$ and R$^6$ are of the formula —NR$^a$R$^b$ wherein R$^a$ and R$^b$ are each independently H; alkyl, more preferably C$_{1-6}$-alkyl, especially C$_{1-4}$-alkyl, more especially methyl, ethyl, n-propyl or iso-propyl; —CO(alkyl), preferably —CO(C$_{1-6}$-alkyl), more preferably —CO(C$_{1-4}$-alkyl), especially —COCH$_3$, —COCH$_2$CH$_3$ and —COCH$_2$CH$_2$CH$_3$; —C$_{1-6}$ hydroxyalkyl; or R$^a$ and R$^b$ together with the nitrogen to which they are attached form an optionally substituted morpholine, piperazine, pyrrolidine or piperidine ring.

When —NR$^a$R$^b$ is a substituted morpholine or piperazine ring it preferably carries a substituent of the formula —M—NR$^{12}$R$^{13}$ wherein M is an alkylene linking group and R$^{12}$ and R$^{13}$ each independently is H or C$_{1-6}$alkyl optionally substituted by hydroxy, C$_{1-6}$alkoxy or carboxy. M is preferably $C_{1-6}$alkylene, more preferably $C_{2-6}$-alkylene and especially —$(CH_2)_g$—, where g is from 2 to 6.

A preferred substituted piperazinyl group represented by —$NR^aR^b$ is of the formula:

$$\text{—N}\underset{}{\overset{}{\diagup\!\!\!\!\diagdown}}\text{N—M—N}(R^{12})R^{13}$$

wherein M, $R^{12}$ and $R^{13}$ are as hereinbefore defined.

Especially preferred substituted piperazinyl groups represented by —$NR^aR^b$ are of the formula:

—N(piperazine)N—($C_{1-6}$-alkylene)$NH_2$ and

—N(piperazine)N—($C_{1-6}$-alkylene)$NH(C_{1-6}$-alkyl)

A further preferred optionally substituted alkyl group represented by $R^3$, $R^4$, $R^5$, $R^6$ or $R^7$ is of the Formula (4):

$$\text{—}(C_aH_{2a}O)_p(C_bH_{2b}O)_qR^{14} \qquad \text{Formula (4)}$$

wherein:

$R^{14}$ is H or alkyl;

a and b are different and from 1 to 6;

p is from 1 to 4; and q is from 0 to 3.

Preferably $R^{14}$ is H or $C_{1-4}$-alkyl, more preferably H.

Preferably a and b are each independently 2 to 6, more preferably 2 or 3. p is preferably 1 or 2. Preferably q is 0.

Preferred groups of the Formula (4) are of the formula —($C_{1-6}$-alkylene)O($C_{1-6}$-alkylene)O$C_{1-4}$alkyl or —($C_{2-6}$-alkylene)O($C_{2-6}$-alkylene)OH. Examples of such groups include —$C_2H_4OC_2H_4OH$, —$C_2H_4OC_2H_4OCH_3$, —$CH_2CH(CH_3)CH_2OC_2H_4OH$ and —$C_3H_6OC_2H_4OH$.

When $R^3$, $R^4$, $R^5$, $R^6$ or $R^7$ is optionally substituted aryl it is preferably optionally substituted phenyl or naphthyl, more preferably optionally substituted phenyl. Preferred optional substituents are $C_{1-6}$-alkoxy, $C_{1-6}$-alkyl, $C_{1-6}$alkyl substituted by hydroxy, carboxy or sulpho, halogen (preferably F or Cl), hydroxy, cyano, carboxy, sulpho, —$PO_3H_2$, nitro, amino, —$COC_{1-4}$-alkyl, —$NHCOC_{1-4}$-alkyl, —$SO_2NH_2$ and —$SO_2NHCOC_{1-4}$-alkyl. More preferably the optionally substituted aryl group is of the formula:

$$\text{—}\underset{}{\diagup\!\!\!\!\diagdown}(R^{15})_t$$

wherein:

$R^{15}$ is $C_{1-4}$-alkyl, $C_{1-4}$-alkoxy, halogen, carboxy, sulpho or —$PO_3H_2$; and t is 0 to 5.

t is preferably 0, 1 or 2.

When $R^3$, $R^4$, $R^5$ or $R^6$ is optionally substituted aralkyl it is preferably of the formula:

$$\text{—}(C_{1-6}\text{-alkylene})\text{—}\underset{}{\diagup\!\!\!\!\diagdown}(R^{15})_t$$

wherein $R^{15}$ and t are as hereinbefore defined.

When $R^5$ and $R^6$ together with the nitrogen to which they are attached form an optionally substituted 5 or 6 membered ring it is preferably an optionally substituted piperidine, piperazine, pyrrolidine or morpholine ring, more preferably optionally substituted piperazine or morpholine. The optional substituents are preferably selected from hydroxy, carboxy, sulpho, $C_{1-6}$alkoxy, $C_{1-6}$-alkyl and $C_{1-6}$-alkyl substituted by hydroxy, carboxy, sulpho and optionally substituted amino as hereinbefore defined. An especially preferred optional substituent is —M—$NR^{12}R^{13}$ wherein $R^{12}$ and $R^{13}$ are as hereinbefore defined.

It is especially preferred that $R^7$ is H or $C_{1-4}$-alkyl optionally substituted by hydroxy, carboxy or sulpho.

$R^4$ is preferably H or $C_{1-4}$-alkyl.

The compound of Formula (1) preferably contains only two azo groups (—N=N—).

The preferred halogen represented by $Z^1$ and/or $Z^2$ is chlorine. It is however, preferred that $Z^1$ and $Z^2$ are, each independently, —$SR^3$, —$OR^4$ or —$NR^5R^6$, more preferably —$SR^3$ or —$NR^5R^6$, and especially —$SR^3$ or —$NHR^5$, wherein $R^3$, $R^4$, $R^5$ and $R^6$ are as hereinbefore defined.

In view of the foregoing preferences with respect to Formula (1), preferred compounds of the first aspect of the present invention are of Formula (5) and salts thereof:

Formula (5)

[Structure of Formula (5) showing a bis-azo dye with two naphthalene units bearing $NH_2$, OH, and $HO_3S$ substituents, connected via N=N to phenyl rings ($B^1$ and $B^2$), then to triazine rings bearing $Z^1$ and $Z^2$ and $X^3$/$X^4$ groups joined by bridge $L^2$]

wherein:

$X^3$ and $X^4$ are each independently an optionally substituted piperazinylene group, —S— or —$NR^7$—;

$L^2$ is group of the Formula (2) as hereinbefore defined, or $C_{2-10}$-alkylene optionally interrupted by —O—, —S—, phenylene, —$NR^8$—, —C(O)—, —CO(O)— or by an optionally substituted piperazinylene group; or —$X^3L^2X^4$— forms an optionally substituted piperazinylene group; and $B^1$, $B^2$, $Z^1$, $Z^2$, $R^7$ and $R^8$ are as hereinbefore defined.

The optionally substituted piperazinylene groups referred to in the definitions of $X^3$, $X^4$, $L^2$ and —$X^3L^2X^4$— are preferably of Formula (3), as hereinbefore defined.

In a preferred compound of Formula (5) $Z^1=Z^2$=halogen (especially Cl), $L^2$ is $C_{2-6}$-alkylene (especially propylene), $X^3=X^4$=NH and $B=B^2$=—$SO_3H$.

The compounds of Formula (5) exhibit a high solubility in aqueous media and provide prints which exhibit high light-fastness and water-fastness when incorporated into inks for ink jet printing.

A particularly preferred embodiment of the present invention comprises a compound of Formula (5) and salts thereof wherein:

$X^3$ and $X^4$ are each independently —$NR^7$— or —S—;

$Z^1$ and $Z^2$ are each independently —$SR^{16}$ or —$NR^{17}R^{18}$;

$R^{16}$ and $R^{17}$ are each independently a group of the formula —($C_{1-6}$-alkylene)O($C_{1-6}$-alkylene)$OR^{19}$ or $C_{1-6}$-alkyl optionally substituted by $C_{1-4}$-alkoxy, hydroxy, carboxy, sulpho, tetrahydrofuryl, morpholinyl or a group of the formula —$NR^{19}CO(C_{1-4}$-alkyl);

$R^{19}$ is H or $C_{1-4}$-alkyl;

$R^7$ and $R^{18}$ are independently H or $C_{1-4}$-alkyl optionally substituted by hydroxy, carboxy or sulpho;

$B^1$ and $B^2$ are sulpho; and $L^2$ is as hereinbefore defined.

Preferably $L^2$ is $C_{2-10}$-alkylene optionally interrupted by —$NR^8$— wherein $R^8$ is as hereinbefore defined, more preferably $L^2$ is $C_{2-4}$-alklene, and especially propylene.

For ease of synthesis $B^1$ and $B^2$ are preferably the same and $Z^1$ and $Z^2$ are preferably the same.

An especially preferred embodiment of the present invention comprises a compound of the Formula (6) and salts thereof:

Formula (6)

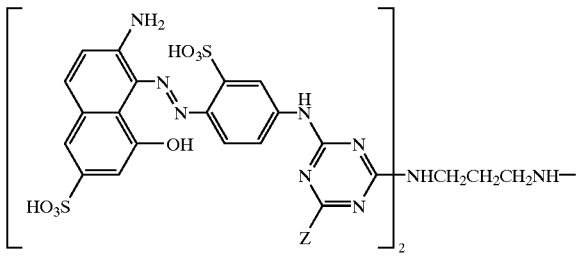

wherein:
a) both groups represented by Z are —$NHCH_2CH_2OH$; or
b) both groups represented by Z are Cl; or
c) one group represented by Z is Cl and the other is —$NHCH_2CH_2OH$.

We have found that mixtures comprising two or more compounds of Formula (1), especially those in which the compounds contain different values for $Z^1$ and $Z^2$ between the compounds of Formula (1), are particularly suitable for use in ink jet printing inks.

Accordingly, a second aspect of the present invention provides a composition comprising:
(a) from 1 to 99 parts of a compound of the Formula (1) as defined in the first aspect of the present invention, provided that $Z^1$ and $Z^2$ are each independently —$SR^3$, —$OR^4$ or —$NR^5R^6$;
(b) from 0 to 50 parts of a compound of the Formula (1) as defined in the first aspect of the present invention, provided that one of $Z^1$ and $Z^2$ is a labile atom or group and the other is —$SR^3$, —$OR^4$ or —$NR^5R^6$; and
(c) from 1 to 99 parts of a compound of the Formula (1) as defined in the first aspect of the present invention, provided that $Z^1$ and $Z^2$ are both a labile atom or group;
wherein $R^3$, $R^4$, $R^5$ and $R^6$ are as hereinbefore defined and all parts are by weight and the total number of parts of (a)+(b)+(c)=100.

The number of parts of component (a) is preferably from 20 to 80, more preferably 40 to 60. The number of parts of component (b) is preferably from 5 to 45 more preferably from 15 to 40. The number of parts of component (c) is preferably from 2 to 60, more preferably from 5 to 30 and especially from 10 to 30.

When $Z^1$ and/or $Z^2$ is a labile atom or group, it is preferably an atom or group which is displaceable by a hydroxyl group of cellulose under mildly alkaline aqueous conditions to form a covalent bond between the compound of the Formula (1) and cellulose.

Preferred labile atoms and groups which may be represented by $Z^1$ and/or $Z^2$ in the second aspect of the invention include halogen atoms, such as F or Cl; sulphonic acid groups; thiocyano groups; quaternary ammonium groups, for example trialkylammonium groups and optionally substituted pyridinium groups, for example 3- and 4-carboxy pyridinium groups. An especially preferred labile atom is Cl.

Preferably in component (a) $Z^1$ and $Z^2$ are identical. In component (c) $Z^1$ and $Z^2$ are preferably identical.

More preferably in component (a) $Z^1$ and $Z^2$ are identical; in component (c) $Z^1$ and $Z^2$ are identical (a); and in component (b) $Z^1$ is identical to $Z^1$ and $Z^2$ in component (a) and $Z^2$ is identical to $Z^1$ and $Z^2$ in component (c).

In preferred compositions according to the second aspect of the invention the compounds of the Formula (1) are of the Formula (5), or more preferably Formula (6) as hereinbefore defined.

The compositions of this second aspect have the attractive shade good light-fastness, good freeze-thaw properties, high stability at elevated temperatures and other properties of the compounds according to the first aspect of the invention, but they also benefit from greater solubility in ink media. This allows strongly coloured, storage stable inks to be prepared giving prints of high optical density. Surprisingly, wet-fastness is not adversely affected even though the compositions have high solubility in aqueous ink media.

An especially preferred composition comprises:
(a) from 40 to 60 parts of a compound of the Formula (5) or a salt thereof wherein $Z^1$ and $Z^2$ are the same and of the formula —$NHR^{17}$ wherein $R^{17}$ is as hereinbefore defined (preferably $C_{1-6}$alkyl optionally substituted by —OH, —$SO_3H$, —COOH or tetrahydrofuryl);
(b) from 5 to 45 parts of a compound of the Formula (5) or a salt thereof wherein $Z^1$ is Cl and $Z^2$ is the same as $Z^2$ in component (a); and
(c) from 10 to 30 parts of a compound of Formula (5) or a salt thereof wherein $Z^1$ and $Z^2$ are Cl;
wherein in Formula (5) $B^1$ and $B^2$ are —$SO_3H$; $L^2$ is the same in each of components (a), (b) and (c) and is $C_{2-4}$-alkylene; $X^3$ and $X^4$ are NH; and all parts are by weight and the sum of the parts (a)+(b)+(c)=100.

In this especially preferred composition the compound of the Formula (5) is preferably of the Formula (6) as hereinbefore defined.

The compounds of the invention may be in the free acid or salt form. Preferred salts are water-soluble, for example alkali metal salts, especially lithium, sodium and potassium salts, ammonium and substituted ammonium salts. Especially preferred salts are salts with sodium, ammonia and volatile amines. The dyes may be converted into a salt using known techniques. For example, an alkali metal salt of a dye may be converted into a salt with ammonia or an amine by dissolving an alkali metal salt of the dye in water, acidifying with a mineral acid and adjusting the pH of the solution to pH 9 to 9. 5 with ammonia or the amine and removing the alkali metal cations by dialysis, reverse osmosis or ultrafiltration.

The compounds and composition according to the present invention may be, and preferably are, purified to remove undesirable impurities before they are incorporated into inks for ink jet printing. Conventional techniques may be employed for purifying the dyes, for example ultrafiltration, reverse osmosis and/or dialysis.

The compounds of the invention may be prepared using conventional techniques for the preparation of azo dyes. For example a suitable method comprises condensing a compound of the Formula HQH with approximately 2 molar equivalents of a compound of the Formula (7):

Formula (7)

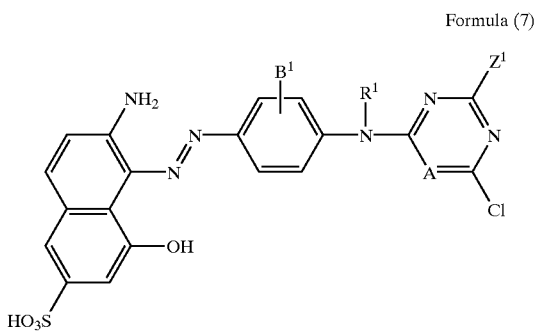

wherein Q, B, $R^1$ and $Z^1$ are as hereinbefore defined.

The compound HQH is preferably of the formula $HX^1LX^2H$ wherein $X^1$, $X^2$ and L are as hereinbefore defined.

The condensation is preferably performed in a liquid medium, more preferably an aqueous medium and especially water. Temperatures of 15° C. to 100° C. are preferred, more preferably from 30 to 40° C. The reaction time is preferably from 1 to 48 hours, more preferably from 3 to 24 hours.

The condensation is preferably performed in the presence of a base. The base may be any inorganic base for example, ammonia, an alkali metal or alkali earth metal hydroxide, carbonate or bicarbonate, or an organic base. Preferred organic bases are tertiary amines for example, N-alkylated heterocycles, for example N—($C_{1-4}$-alkyl)-morpholine, N—($C_{1-4}$-alkyl)piperidine, N, N'-di($C_{1-4}$-alkyl)piperazine; tri($C_{1-4}$-alkyl)amines, for example triethylamine, and optionally substituted pyridines, especially pyridine.

The amount of base used may be varied between wide limits but it is preferred to use less than 40, more preferably less than 10 and especially from 3 to 5 moles for each mole of the compound of Formula (7).

After the condensation the product may be isolated by precipitating the product as a salt from the reaction mixture for example by the addition of a suitable alkali metal salt, especially sodium chloride. Alternatively, the product may be isolated in its free acid form by acidifying the reaction mixture, preferably using a mineral acid, especially hydrochloric acid. Where the product precipitates as a solid it may be separated from the mixture by filtration.

If desired unwanted anions may be removed from the product of the above process by dialysis, osmosis, ultrafiltration or a combination thereof.

The product of the above process may be converted, if desired, to the $NH_4^+$, quaternary ammonium or organic amine salt by the addition of ammonia, ammonium hydroxide, primary, secondary, tertiary or quaternary amine. When the base used in the condensation process is an organic amine an excess may be used so that the compound of Formula (1) is formed as the organic amine salt.

The compound of the Formula (7) may be prepared using conventional techniques, for example by:

(1) diazotising a compound of the Formula (8) to give the corresponding diazonium salt:

Formula (8)

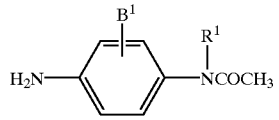

wherein $R^1$ and $B^1$ is as hereinbefore defined;

(2) coupling the diazonium salt from stage (1) with 2-amino-8-naphthol-6-sulphonic acid at a pH<7, preferably at a pH of from 3 to 5;

(3) hydrolysing the product of stage (2) under alkaline conditions to give a compound of the Formula (9):

Formula (9)

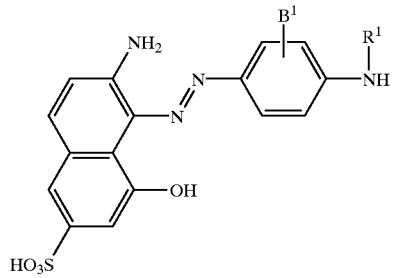

(4) condensing the product from stage (3) with approximately 1 molar equivalent of the compound of the formula:

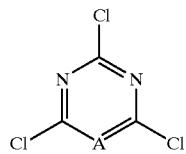

wherein A is as hereinbefore defined; and (5) condensing the product from stage (4) with approximately 1 molar equivalent of the compound of the formula $Z^1H$.

The diazotisation in stage (1) is preferably performed in an aqueous medium at a pH below 7 in the presence of a suitable diazotisation agent. Dilute mineral acid, e. g. HCl or $H_2SO_4$, is preferably used to achieve the desired acidic conditions. Conveniently the diazotisation agent is formed in-situ, for example by dissolving an alkali metal nitrite, preferably sodium nitrite, in a molar excess of mineral acid, preferably HCl. Normally at least one mole of diazotisation agent per mole of the compound of Formula (8), preferably from 1 to 1.25 moles will be used in the diazotisation.

The temperature of the diazotisation is not critical and may conveniently be carried out at from −5° C. to 20° C. , preferably from 0 to 10° C. and especially from 0 to 5° C.

The hydrolysis in stage (3) is preferably performed at a pH of from 9 to 14. The temperature during hydrolysis is preferably 40 to 90° C.

When $B^1$ and $B^2$, $R^1$ and $R^2$ or $Z^1$ and $Z^2$ are different, the compounds of Formula (1) are preferably prepared by condensing a compound of the Formula (7) with an approximately equimolar quantity of the compound of the formula HQH (preferably $HX^1LX^2H$). The product of this reaction is then further condensed with an approximately equimolar quantity of a compound of the Formula (7) wherein $R^1$ is $R^2$, $B^1$ is $B^2$ and $Z^1$ is $Z^2$ as hereinbefore defined.

Alternatively, a compound of Formula (1) or Formula (5) in which one or both of $Z^1$ and $Z^2$ are other than halogen, may be prepared by condensing a compound of Formula (1) or Formula (5), in which $Z^1=Z^2=Cl$, with sufficient of a compound or compounds $Z^1H$ and/or $Z^2H$, wherein $Z^1$ and $Z^2$ are as hereinbefore defined except for Cl, under such conditions of temperature and/or time as to replace one or both Cl atoms.

The compositions according to the second aspect of the invention comprising components (a) and (c) can be prepared by mixing together the two components prepared as hereinbefore described. When the composition according to the second aspect of the invention comprises components (a), (b) and (c) it is preferably prepared by reacting the compound of Formula (7) in which both $Z^1$ and $Z^2$ are Cl with insufficient of the compound $Z^1H$ (in which $Z^1$ is not Cl) and/or under such temperature and/or temperature conditions as not to replace all the Cl atoms in the compound of Formula (7) to give a mixture of non-reacted, mono- and di-reacted products.

The compounds of Formula (1) may exist in tautomeric forms other than those shown in this specification. These tautomers are included within the scope of the present claims.

According to a third aspect of the present invention there is provided an ink comprising:

(a) from 0.01 to 30 parts in total of one or more compounds of the Formula (1), as hereinbefore defined, with the proviso that $Z^1$ and/or $Z^2$ may also be a labile atom or group; and (b) from 70 to 99.99 parts of a medium comprising a mixture of water and an organic solvent, an organic solvent free from water, or a low melting point solid;

wherein all parts are by weight and the number of parts of (a)+(b)=100.

Preferred labile atoms and groups which may be represented by $Z^1$ and/or $Z^2$ are as hereinbefore defined in the second aspect of the present invention, especially chloro.

When component (a) of the ink is a mixture of more than one compound of Formula (1) or (5) it is preferably from 2 to 8, more preferably 2 or 3, especially 3 compounds of Formula (1) as defined in the second aspect of the present invention, and more especially is a two or three component mixture as hereinbefore defined in relation to the second aspect of the present invention.

In the inks according to the third aspect of the present invention component (a) of the ink is preferably a compound of the Formula (5), more preferably of the Formula (6), as hereinbefore defined in relation to the first aspect of the invention. It is especially preferred that component (a) of the ink is a composition according to the second aspect of the present invention.

The number of parts of component (a) is preferably from 0.1 to 20, more preferably from 0.5 to 15, and especially from 1 to 5 parts. The number of parts of component (b) is preferably from 99.9 to 80, more preferably from 99.5 to 85, especially from 99 to 95 parts.

When the medium is a mixture of water and an organic solvent or an organic solvent free from water, preferably component (a) is completely dissolved in component (b). Preferably component (a) has a solubility in component (b) at 20° C. of at least 10%. This allows the preparation of concentrates which may be used to prepare more dilute inks and reduces the chance of the dye precipitating if evaporation of the liquid medium occurs during storage.

When the medium comprises a mixture of water and an organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-soluble organic solvents.

Especially preferred water-soluble organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

A preferred medium comprises:

(a) from 75 to 95 parts water; and (b) from 25 to 5 parts in total of one or more solvents selected from diethylene glycol, 2-pyrrolidone, thiodiglycol, N-methylpyrrolidone, cyclohexanol, caprolactone, caprolactam and pentane-1,5-diol;

wherein the parts are by weight and the sum of the parts (a) and (b)=100.

Examples of further suitable ink media comprising a mixture of water and one or more organic solvents are described in U.S. Pat. Nos. 4,963,189, 4,703,113, 4,626,284, EP 425,150A and U.S. Pat. No. 5,207,824.

When the liquid medium comprises an organic solvent free from water, (i. e. less than 1% water by weight) the solvent preferably has a boiling point of from 300 to 200° C., more preferably of from 40° to 150° C., especially from 50 to 125° C. The organic solvent may be water-immiscible, water-miscible or a mixture of such solvents. Preferred water-miscible organic solvents are any of the hereinbefore described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the dye in the liquid medium. Examples of polar solvents include $C_{1-4}$-alcohols. In view of the foregoing preferences it is especially preferred that where the liquid medium is an organic solvent free from water it comprises a ketone (especially methyl ethyl ketone) &/or an alcohol (especially a $C_{1-4}$-alkanol, for example ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability of the ink.

Ink media comprising an organic solvent free from water are particularly useful where fast drying times are required and particularly when printing onto hydrophobic and non-absorbent substrates, for example plastics, metal and glass.

Preferred low melting solid media have a melting point in the range from 60° C. to 125° C. Suitable low melting point solids include long chain fatty acids or alcohols, preferably those with $C_{18-24}$ chains, and sulphonamides. The dye of Formula (5) may be dissolved in the low melting point solid or may be finely dispersed in it.

The dyes according to the present invention exhibit a high solubility in aqueous media, accordingly it is preferred that the liquid medium is a mixture of water and one or more water miscible organic solvent(s).

The ink and composition may also contain additional components conventionally used in ink jet printing inks, for example viscosity and surface tension modifiers, corrosion inhibitors, biocides, kogation reducing additives, anti-cockle agents to reduce paper curling and surfactants which may be ionic or non-ionic.

When the inks according to the third aspect of the invention are used as ink jet printing inks, the ink preferably has a concentration of less than 100 parts per million, more preferably less than 50 parts per million, in total of halide ions and divalent and trivalent metals. This reduces nozzle blockage in ink jet printing heads, particularly in thermal ink jet printers.

A fourth aspect of the present invention provides a process for printing an image on a substrate comprising applying thereto an ink containing a compound or a composition a according to the first or second aspect of the invention by means of an ink jet printer.

The ink used in this process is preferably as defined in the third aspect of the present invention, especially where component (a) is a composition according to the second aspect of the present invention.

The ink jet printer preferably applies the ink to the substrate in the form of droplets which are ejected through a small orifice onto the substrate. Preferred ink jet printers are piezoelectric ink jet printers and thermal ink jet printers. In thermal ink jet printers, programmed pulses of heat are applied to the ink in a reservoir by means of a resistor adjacent to the orifice, thereby causing the ink to be ejected in the form of small droplets directed towards the substrate during relative movement between the substrate and the orifice. In piezoelectric ink jet printers the oscillation of a small crystal causes ejection of the ink from the orifice.

The substrate is preferably paper, plastic, a textile, metal or glass, more preferably paper, an overhead projector slide or a textile material, especially paper.

Preferred papers are plain or treated papers which may have an acid, alkaline or neutral character. Examples of commercially available treated papers include HP Premium Coated Paper (available from Hewlett Packard Inc), HP Photopaper (available from Hewlett Packard Inc), Stylus Pro 720 dpi Coated Paper, Epson Photo Quality Glossy Film (available from Seiko Epson Corp.), Epson Photo Quality Glossy Paper (available from Seiko Epson Corp.), Canon HR 101 High Resolution Paper (available from Canon), Canon GP 201 Glossy Paper (available from Canon), and Canon HG 101 High Gloss Film (available from Canon).

A fifth aspect of the present invention provides a substrate, preferably a paper, an overhead projector slide or a textile material, printed with an ink according to the third aspect of the present invention or by means of the process according to the fourth aspect of the present invention, or coated with a compound according to the first aspect of the present invention or a composition according to the second aspect of the present invention.

When the substrate is a textile material the ink according to the third aspect of the present invention preferably contains one or more compounds according to the first aspect or compositions according to the second aspect having at least one, and more preferably two, labile group or atom. Such an ink is preferably applied to the textile material by an ink jet printer followed by heating the printed textile material at a temperature of from 50° C. to 250° C.

Preferred textile materials are natural, synthetic and semi-synthetic materials. Examples of preferred natural textile materials include wool, silk, hair and cellulosic materials, particularly cotton, jute, hemp, flax and linen. Examples of preferred synthetic and semi-synthetic materials include polyamides, polyesters, polyacrylonitriles and polyurethanes.

The textile material is preferably pre-treated with an aqueous pre-treatment composition comprising a thickening agent and optionally a water-soluble base and a hydrotropic agent and dried prior to applying the ink. The pre-treatment composition preferably comprises a solution of the base and the hydrotropic agent in water containing the thickening agent. Particularly preferred pre-treatment compositions are described in EP 534,660A.

According to a sixth aspect of the present invention there is provided an ink jet printer cartridge containing an ink, characterised in that the ink contains a compound of the Formula (1) as defined in the first aspect of the invention, or a composition according to the second aspect of the invention.

Preferably the ink contained in the ink jet printer cartridge is an ink according to the third aspect of the present invention.

The invention is further illustrated by the following Examples in which all parts and percentages are by weight unless otherwise stated.

EXAMPLE 1

Dye (1)

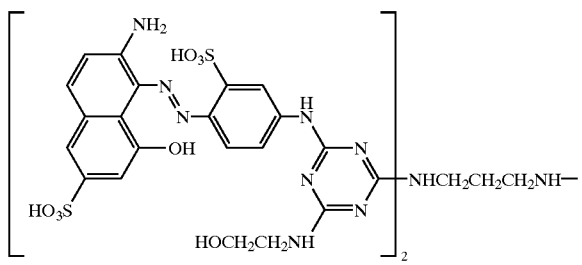

Dye 1 was prepared in accordance with following process:

Stage (1): Diazotisation and Coupling

To N-acetyl p-phenylenediamine sulphonic acid (0.5 moles) in water (400 ml) was added concentrated hydrochloric acid (250 ml) and the solution was cooled to 0–5° C. 2N sodium nitrite (250 ml) was added dropwise over 5 minutes with stirring. After 15 minutes, excess nitrous acid was destroyed by the addition of sulphamic acid (0.2 g). To the resulting suspension was added a solution of 2-amino-8-naphthol-6-sulphonic acid (0.5 moles in 600 ml of water at pH6) and the pH was adjusted to 4 by the addition of sodium acetate. The mixture was stirred at 0–5° C. for 4 hours before being allowed to warm to room temperature.

Stage (ii) Hydrolysis

The acetyl group present on the product of stage (i) was removed by alkaline hydrolysis by adding concentrated sodium hydroxide (200 ml) to the mixture resulting from stage 1 and heating at 70–80° C. for 1.5 hours.

After cooling to room temperature, the pH was adjusted to 7 by the addition of concentrated hydrochloric acid. Sodium chloride (20% weight/volume) was added and the precipitated solid was collected by suction filtration, washed with 30% brine and dried at 70° C. Yield 132 g (strength 45%).

Stage (iii) Condensation with Cyanuric Chloride

The product from Stage (ii) (0.15 moles) was dissolved in water (500 ml) at pH7. Cyanuric chloride (0.17 moles) was dissolved in acetone (300 ml) and added dropwise to the stirred solution at 0–5° C. The mixture was then stirred for 40 minutes.

Stage (iv) Condensations 1,3-diaminopropane (0.08 moles) was added. The temperature was raised to 30–40° C. and the pH maintained at 8.5–9 for a period of 16 hours. Ethanolamine (0.45 moles) was added and the temperature of the mixture was elevated to 70–80° C. The pH was maintained at 9–10 for a period of 6 hours. Methylated spirits was added to precipitate the product which was collected by suction filtration and washed with further methylated spirits. The crude dye was redissolved in distilled water and dialysed using visking tubing to a permeate conductivity of below 100 $\mu$S. The solution was evaporated to dryness giving a yield of 185 g of the title product.

Ink

Ink 1 was prepared by dissolving 2 parts of Dye (1) in 98 parts of a mixture comprising 90 parts water and 10 parts 2-pyrrolidone.

Ink Jet Printing

Ink 1 was loaded into a Hewlett Packard Deskjet 560c ink jet printer and was printed onto HP Premium Glossy Paper (available from Hewlett Packard Inc.). The resulting print was a bright magenta which had a good optical density end excellent light fastness.

The optical density of the print was 1.32, as measured using an X-Rite densitometer.

The print exhibited a $\Delta E$ value of 7.8, as measured using an X-Rite densitometer, and an optical density loss of just 9% after 64 hours irradiation in the Atlas Weatherometer.

EXAMPLE 2

Dyes of the formula

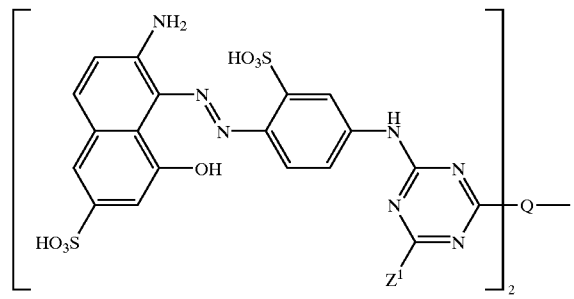

were prepared by condensing the compound H—Q—H shown in Table 1 with approximately 2 molar equivalents of the product of stage (iii) in Example 1. The resulting product was then condensed with approximately 2 molar equivalents of the compound of the formula $Z^1H$ shown in Table 1. The reaction conditions used were analogous to those used in stage (iv) of Example 1. In Table 1 the symbol "—" indicates that the compound was not condensed with $Z^1H$, i. e. $Z^1$=—Cl.

TABLE 1

| Dye | HQH | $Z^1H$ |
|---|---|---|
| 2 | $NH_2(CH_2)_2NH_2$ | $NH_2(CH_2)_2OH$ |
| 3 | $NH_2(CH_2)_2$—N⟩‌‌‌‌‌‌‌‌‌‌N—$(CH_2)_2NH_2$ | $NH_2(CH_2)_2OH$ |
| 4 | $NH_2$—⟨C$_6$H$_4$⟩—$NH_2$ | $HS(CH_2)_3SO_3H$ |

TABLE 1-continued

| Dye | HQH | Z¹H |
|---|---|---|
| 5 | $NH_2(CH_2)_3NH_2$ | $H_2N-CH_2$-(tetrahydrofuran-2-yl) |
| 6 | $NH_2(CH_2)_3NH_2$ | $H_2N(CH_2)_2O(CH_2)_2OH$ |
| 7 | $NH_2(CH_2)_3NH_2$ | $HS(CH_2)_3SO_3H$ |
| 8 | $NH_2(CH_2)_3NH_2$ | $NH_2(CH_2)_2OH$ |
| 9 | $NH_2(CH_2)_3NH_2$ | morpholine (O-CH₂CH₂-NH-CH₂CH₂) |
| 10 | $NH_2(CH_2)_3NH_2$ | $SH(CH_2)_2COOH$ |
| 11 | $NH_2(CH_2)_3NH_2$ | $H_2O$ |
| 12 | $NH_2(CH_2)_3NH_2$ | — |
| 13 | $NH_2(CH_2)_3NH_2$ | $SH(CH_2)_2COOH$ |
| 14 | $NH_2(CH_2)_3NH_2$ | $NH_2(CH_2)_2SO_3H$ |
| 15 | 2,5-dimethylpiperazine | $NH_2(CH_2)_2OH$ |
| 16 | $NH_2(CH_2)_3NH_2$ | proline (HOOC-pyrrolidine) |
| 17 | 2,5-dimethylpiperazine | $H_2N(CH_2)_2O(CH_2)_2OH$ |
| 18 | $NH_2(CH_2)_3NH_2$ | $NH_2(CH_2)_2COOH$ |
| 19 | $NH_2(CH_2)_4NH_2$ | $NH_2(CH_2)_2OH$ |
| 20 | $NH_2(CH_2)_3NH_2$ | $NH_2CH_2COOH$ |
| 21 | $NH_2(CH_2)_4NH_2$ | $H_2N(CH_2)_2O(CH_2)_2OH$ |
| 22 | 1,3-diaminobenzene | $NH_2(CH_2)_2SO_3H$ |
| 23 | $H_2N(CH_2)_3(O(CH_2)_2)_2(OCH_2)_2NH_2$ | — |
| 24 | 1,3-diaminobenzene | $NH(CH_2CH_2OH)_2$ |
| 25 | $H_2N(CH_2)_3(O(CH_2)_2)_2O(CH_2)_3NH_2$ | $NH_2(CH_2)_2SO_3H$ |
| 26 | $H_2NCH(COOH)SSCH_2CH(COOH)NH_2$ | $NH_2(CH_2)_2SO_3H$ |
| 27 | $H_2NCH(COOH)CH_2SH$ | $HN(CH_3)(CH_2CH_2OH)$ |
| 28 | $H_2NCH(COOH)CH_2SH$ | $HN(CH_3)(CH_2CH_2SO_3H)$ |
| 29 | $H_2NCH(COOH)CH_2SH$ | — |
| 30 | $H_2N(CH_2)_2O(CH_2)_2)_3NH_2$ | $NH_2CH_2CH(OH)CH_2OH$ |
| 31 | $H(CH_2CH_2OH)N(CH_2)_2N(CH_2CH_2OH)H$ | $NH_2(CH_2)_2O(CH_2)_2OH$ |
| 32 | $H(CH_2CH_2OH)N(CH_2)_2N(CH_2CH_2OH)H$ | $NH_2(CH_2)_2SO_3H$ |
| 33 | $H(CH_2CH_2OH)N(CH_2)_2N(CH_2CH_2OH)H$ | $NH_2(CH_2)_2COOH$ |
| 34 | $NH_2(CH_2)_3NH_2$ | $NH_2CH_2CH(OH)CH_2OH$ |
| 35 | $NH_2(CH_2)_3NH_2$ | $HN(CH_3)(CH_2CH_2SO_3H)$ |

TABLE 1-continued

| Dye | HQH | Z¹H |
|---|---|---|
| 36 | NH$_2$(CH$_2$)$_3$NH$_2$ | HN(CH$_3$)(CH$_2$CH$_2$COOH) |
| 37 | NH$_2$(CH$_2$)$_3$NH$_2$ | NH(CH$_2$COOH)$_2$ |

EXAMPLE 3

Inks and Ink Jet Printing

Each dye shown in Table 1 was formulated into an ink by dissolving 2.5 parts of relevant dye in 97.5 parts of an ink medium consisting of 88 parts water, 5 parts thiodiglycol, 5 parts 2-pyrrolidone and 2 parts Surfynol 465™ (non-ionic surfactant).

Each ink was loaded into a Canon 4300 ink jet printer and printed onto Xerox Acid 4024™ paper (available from Xerox Inc.) and SEC Glossy Film (available from Seiko Epson). The resulting prints exhibited a high reflected optical density, a high light fastness good water-fastness.

The reflected optical density (ROD) and light-fastness (ΔE) were measured as described in Example 1.

The water-fastness (WF) was measured as follows. A print comprising a series of printed parallel bars was held at an angle of 45° with the parallel bars horizontal. A 3 ml disposable bulb pipette (ex. Alpha Labs Ltd., Eastleigh, Hampshire—supplied by Orme Scientific), cut down to the 0.5 ml mark (to give a 6 mm aperture) was filled to the 0.1 ml mark with distilled water. The distilled water was then applied to the prints just above the top of the parallel printed bars, taking care to ensure that the rundown of the water occurred as a single 'track' which was as vertical as possible through the horizontal printed bars.

The reflected optical density (ROD) in the area stained by the rundown of the water below the first four printed bars was measured and the mean ROD for each print calculated. The ROD values were measured using an X-Rite™938 densitometer set to status T (Den T). The mean ROD was matched to a scale of 1 to 10 wherein 1 corresponds to a high mean ROD and hence a poor water fastness (i. e. high degree of staining between the printed bars) and 10 corresponds to a low mean ROD and a high water fastness (i. e. negligible staining between the printed bars).

For Dye (5) the following results were obtained:

Prints on Xerox 4024 Acid Paper

Reflected optical density: 0.93

Water-fastness: 7

Light-fastness (after 50 hours fading): 6.8

Prints on SEC Glossy Film

Reflected optical density: 1.79

Water-fastness: 10

Light-fastness (after 50 hours fading): 6.5

The dyes described in Examples 1 and 2 are preferably purified before incorporation into an ink, preferably using a combination of reverse osmosis and ultrafiltration, such that when the dye is incorporated into an ink, the ink contains less than 10 parts per million it total of halogen ions and divalent and trivalent metal ions.

EXAMPLE 4

Preparation of a Mixture of Dyes (A), (B) and (C)

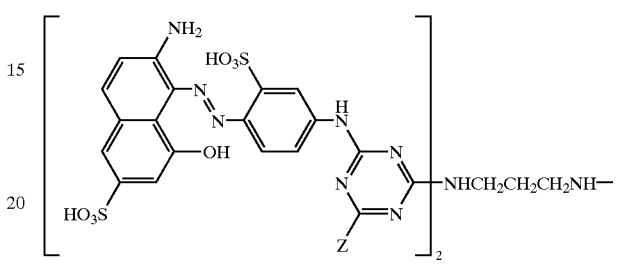

In Dye (A) both groups represented by Z are —NH$_2$CH$_2$CH$_2$OH.

In Dye (B) one group represented by Z is Cl and the other is —NH$_2$CH$_2$CH$_2$OH.

In Dye (C) both groups represented by Z are Cl.

The method of Example 1 was repeated except that the condensation reaction with ethanolamine in stage (iv) was stopped after 2.5 hours. The product was a mixture of Dye (A), Dye (B) and Dye (C) in relative proportions 43:35:22 by weight. This dye mixture has a solubility of 10% in water at 20° C. compared to a solubility of 3% for Dye (A) alone under the same conditions. In spite of the significantly higher solubility of the mixture, the wet-fastness of the mixture on paper was the same as for Dye (A) alone.

EXAMPLE 5 TO 9

Dye Compositions

The ratio of Dyes (A), (B) and (C) in Example 4 may be varied by altering the time and temperature of the ethanolamine condensation step (Example 1, step (iv)). The solubility of a variety of dye compositions in water at 20° C. and pH 9.5 is shown in Table 2 below together with optical density, light fastness (ΔE after 50 hours) and wet-fastness results of prints prepared from these compositions. The prints were prepared by printing an ink formed by dissolving 2.5 parts of each composition in 97.5 parts of a mixture consisting of 88 parts water, 5 parts thiodiglycol, 5 parts 2-pyrrolidone and 2 parts Surfynol 465™ (a non-ionic surfactant) onto the substrate shown in the third column of Table 2 using a Canon 4300 ink jet printer.

The dye ratios in Table 2 are the relative proportions of Dye (A):(B):(C) by weight.

In Example 5 the dye used was Dye (1) as described in Example 1.

In Example 6 the dye was prepared using the process described in Example 1 except that the dye was isolated after the condensation with 1,3-diaminopropane in stage (iv) of the process.

In Example 7 the dye composition may be prepared as described in Example 1 except that the reaction with ethanolamine is stopped when all of the dichloro starting material has been consumed (i. e. once all the dichloro dye of Example 6 has reacted with ethanolamine).

In Example 8 the dye was prepared using an analogous process to that described in Example 1 except that in stage (iv) the condensation with diaminopropane was carried out at a temperature of 20° C. for 5 hours; and the condensation with ethanolamine was stopped after 1.5 hours.

In Example 9 the dye was prepared by mixing in a 1:1 ratio Dye (1) from example 1 and the dye used in Example 6.

TABLE 2

| Ex | Dye ratio | Solubility (%) | Substrate | OD | Light-fastness (ΔE @ 50 hrs) | Wet-fastness |
|---|---|---|---|---|---|---|
| 5 | 100:0:0 | 3 | XA | 0.99 | 6.2 | 7 |
|   |         |   | SG | 1.84 | 6 | 10 |
| 6 | 0:0:100 | 10 | XA | 0.90 | 6.4 | 7 |
|   |         |    | SG | 1.7 | 4.8 | 10 |
| 7 | 50:50:0 | 4 | XA | — | high | good |
|   |         |   | SG | — | high | good |
| 8 | 45:42:13 | 7.5 | XA | — | high | good |
|   |          |     | SG | — | high | good |
| 9 | 50:0:50 | — | XA | 0.97 | 7 | 7 |
|   |         |   | SG | 1.76 | 4.2 | 10 |

In Table 2

TABLE 2-continued

| Ex | Dye ratio | Solubility (%) | Substrate | OD | Light-fastness (ΔE @ 50 hrs) | Wet-fastness |
|---|---|---|---|---|---|---|

XA = Xerox 4024 Acid Paper
SG = Seiko Epson glossy film

EXAMPLE 10

The inks described in Tables 3 and 4 may be prepared wherein the Dye described he first column is the Dye described in Examples 1 and 2. Numbers quoted in the second column onwards refer to the number of parts of the relevant ingredient and all parts are by weight. The inks may be applied to paper by thermal or piezo ink jet printing.

PG = propylene glycol
NMP = N-methyl pyrrolidone
IPA = isopropanol
2P = 2-pyrrolidone
P12 = propane-1,2-diol
CET = cetyl ammonium bromide
TBT = tertiary butanol
DEG = diethylene glycol
DMK = dimethylketone
GLY = glycerol
MIBK = methylisobutyl ketone
BDL = butane-2,3-diol
PHO = $Na_2HPO_4$ and
TDG = thiodiglycol

TABLE 3

| Dye | Dye Content | Water | PG | DEG | NMP | DMK | NaOH | Na Stearate | IPA | GLY | 2P | MIBK |
|---|---|---|---|---|---|---|---|---|---|---|---|---|
| 2 | 2.0 | 80 | 5 |   | 6 | 4 |   |   |   |   | 5 |   |
| 4 | 3.0 | 90 |   | 5 | 5 |   | 0.2 |   |   |   |   |   |
| 7 | 10.0 | 85 | 3 |   | 3 | 3 |   |   |   | 5 | 1 |   |
| 5 | 2.1 | 91 |   | 8 |   |   |   |   |   |   |   | 1 |
| 1 | 3.1 | 86 | 5 |   |   |   |   | 0.2 | 4 |   |   | 5 |
| 1 | 1.1 | 81 |   |   | 9 |   | 0.5 | 0.5 |   |   | 9 |   |
| 3 | 2.5 | 60 | 4 | 15 | 3 | 3 |   |   | 6 | 10 | 5 | 4 |
| 4 | 5 | 65 |   | 20 |   |   |   |   | 10 |   |   |   |
| 3 | 2.4 | 75 | 5 | 4 |   | 5 |   |   |   | 6 |   | 5 |
| 7 | 4.1 | 80 | 3 | 5 | 2 | 10 |   | 0.3 |   |   |   |   |
| 5 | 3.2 | 65 |   | 5 | 4 | 6 |   |   | 5 | 4 | 6 | 5 |
| 4 | 5.1 | 96 |   |   |   |   |   |   |   | 4 |   |   |
| 3 | 10.8 | 90 | 5 |   |   |   |   |   | 5 |   |   |   |
| 1 | 10.0 | 80 | 2 | 6 | 2 | 5 |   |   | 1 |   | 4 |   |
| 3 | 1.8 | 80 |   |   | 5 |   |   |   |   |   | 15 |   |
| 5 | 2.6 | 84 |   |   | 11 |   |   |   |   |   | 5 |   |
| 4 | 3.3 | 80 | 2 |   |   | 10 |   |   |   | 2 |   | 6 |
| 1 | 12.0 | 90 |   |   | 7 |   | 0.3 |   | 3 |   |   |   |
| 6 | 5.4 | 69 | 2 | 20 | 2 | 1 |   |   |   |   | 3 | 3 |
| 7 | 6.0 | 91 |   |   | 4 |   |   |   |   |   | 5 |   |

TABLE 4

| Dye | Dye Content | Water | PG | DEG | NMP | CET | TBT | TDG | BDL | PHO | 2P | PI2 |
|---|---|---|---|---|---|---|---|---|---|---|---|---|
| 2 | 3.0 | 80 | 15 |   |   | 0.2 |   |   |   |   | 5 |   |
| 3 | 9.0 | 90 |   | 5 |   |   |   |   |   | 1.2 |   | 5 |
| 5 | 1.5 | 85 | 5 | 5 |   | 0.15 | 5.0 | 0.2 |   |   |   |   |
| 7 | 2.5 | 90 |   | 6 | 4 |   |   |   |   | 0.12 |   |   |
| 6 | 3.1 | 82 | 4 | 8 |   | 0.3 |   |   |   |   |   | 6 |
| 1 | 0.9 | 85 |   | 10 |   |   |   |   | 5 | 0.2 |   |   |
| 2 | 8.0 | 90 |   | 5 | 5 |   | 0.3 |   |   |   |   |   |
| 6 | 4.0 | 70 |   | 10 | 4 |   |   |   | 1 |   | 4 | 11 |
| 12 | 2.2 | 75 | 4 | 10 | 3 |   |   |   | 2 |   | 6 |   |
| 5 | 10.0 | 91 |   |   | 6 |   |   |   |   |   | 3 |   |
| 7 | 9.0 | 76 |   | 9 | 7 |   | 3.0 |   |   | 0.95 | 5 |   |
| 3 | 5.0 | 78 | 5 | 11 |   |   |   |   |   |   | 6 |   |
| 1 | 5.4 | 86 |   |   | 7 |   |   |   |   |   | 7 |   |

TABLE 4-continued

| Dye | Dye Content | Water | PG | DEG | NMP | CET | TBT | TDG | BDL | PHO | 2P | PI2 |
|---|---|---|---|---|---|---|---|---|---|---|---|---|
| 3 | 2.1 | 70 | 5 | 5 | 5 | 0.1 | 0.2 | 0.1 | 5 | 0.1 | 5 | |
| 4 | 2.0 | 90 | | 10 | | | | | | | | |
| 2 | 2 | 88 | | | | | | 10 | | | | |
| 5 | 5 | 78 | | | 5 | | | 12 | | | 5 | |
| 3 | 8 | 70 | 2 | | 8 | | | 15 | | | 5 | |
| 7 | 10 | 80 | | | | | | 8 | | | 12 | |
| 6 | 10 | 80 | | 10 | | | | | | | | |

What is claimed is:

1. A compound of Formula (1) or salt thereof:

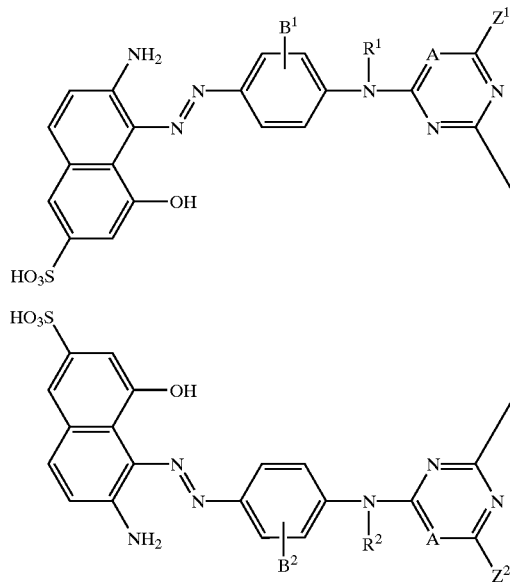

Formula (1)

wherein:

$B^1$ and $B^2$ are each independently —$SO_3H$, —COOH, —$CF_3$, optionally substituted alkoxy, optionally substituted alkyl or —$PO_3H_2$;

Q is an organic linking group;

$R^1$ and $R^2$ are each independently H or optionally substituted alkyl;

each A independently is N, C—Cl, C—CN or C—$NO_2$;

$Z^1$ and $Z^2$ are each independently —$SR^3$, —$OR^4$, —$NR^5R^6$ or halogen;

$R^3$, $R^4$, $R^5$ & $R^6$ are each independently H, optionally substituted alkyl, optionally substituted aryl or optionally substituted aralkyl; or $R^5$ and $R^6$ together with the nitrogen to which they are attached form an optionally substituted five or six membered ring;

provided that Q is not of the formula:

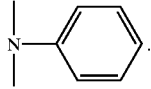

2. A compound according to claim 1 wherein $B^1$ and $B^2$ are each independently —$SO_3H$, —COOH, —$CF_3$, alkoxy, alkyl or —$PO_3H_2$.

3. A compound according to either claim 1 or claim 2 wherein $B^1$ and $B^2$ are attached ortho to the azo group.

4. A compound according to claim 1 wherein $Z^1$ and $Z^2$ are each independently —$SR^3$, —$OR^4$ or —$NR^5R^6$.

5. A compound according to claim 1 wherein:

Q is an optionally substituted piperazinylene group, or a group of the formula —$X^1$—L—$X^2$—;

$X^1$ and $X^2$ are each independently an optionally substituted piperazinylene group, —S—, —O— or —$NR^7$—;

$R^7$ is H, optionally substituted alkyl or optionally substituted aryl; and

L is a divalent organic linking group.

6. A compound according to claim 1 of the Formula (5) and salts thereof:

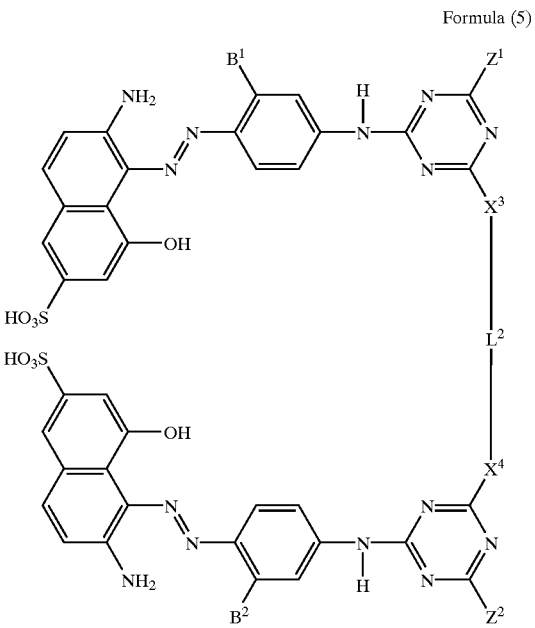

Formula (5)

wherein:

$B^1$, $B^2$, $Z^1$ and $Z^2$ are as defined;

$X^3$ and $X^4$ are each independently an optionally substituted piperazinylene group, —S— or —$NR^7$—;

$R^7$ is H, optionally substituted alkyl or optionally substituted aryl;

$L^2$ is a group of the Formula (2), or $C_{2-10}$-alkylene optionally interrupted by —O—, —S—, phenylene, —$NR^8$—, —C(O)—, —CO(O)— or by an optionally substituted piperazinylene group:

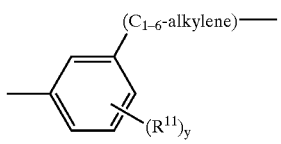

Formula (2)

each

R$^{11}$ independently is H, C$_{1-4}$-alkoxy, F, Cl, —SO$_3$H, —COOH, —OH, —CN, —NO$_2$ or C$_{1-4}$-alkyl optionally substituted by —OH, —COOH or —SO$_3$H;

R$^8$ is H, C$_{1-4}$-alkyl or C$_{1-4}$hydroxyalkyl;

y is 1 to 4; or

—X$^3$L$^2$X$^4$— forms an optionally substituted piperazinylene group.

7. A compound according to claim 6 wherein the optionally substituted piperazinylene groups referred to in the definitions of X$^3$, X$^4$, L$^2$ and —X$^3$L$^2$X$^4$— are of Formula (3):

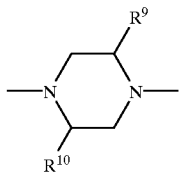

Formula (3)

wherein:

R$^9$ and R$^{10}$ are each independently H or C$_{1-4}$-alkyl optionally substituted by hydroxy, sulpho or carboxy.

8. A compound according to either claim 6 or claim 7 wherein:

X$^3$ and X$^4$ are each independently —NR$^7$— or —S—;

Z$^1$ and Z$^2$ are each independently —SR$^{16}$ or —NR$^{17}$R$^{18}$;

R$^{16}$ and R$^{17}$ are each independently a group of the formula —(C$_{1-6}$-alkylene)O(C$_{1-6}$-alkylene)OR$^{19}$ or C$_{1-6}$-alkyl optionally substituted by C$_{1-4}$-alkoxy, hydroxy, carboxy, sulpho, tetrahydrofuryl, morpholinyl or a group of the formula —NR$^{19}$CO(C$_{1-4}$-alkyl);

R$^{19}$ is H or C$_{1-4}$-alkyl;

R$^7$ and R$^{18}$ are each independently H or C$_{1-4}$-alkyl optionally substituted by oxy, carboxy or sulpho;

B$^1$ and B$^2$ are sulpho; and

L$^2$ is a group of the Formula (2), or C$_{2-10}$-alkylene optionally interrupted by —O—, —S—, phenylene, —NR$^8$—, —C(O)—, —CO(O)— or by an optionally substituted piperazinylene group:

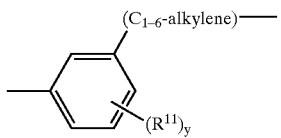

Formula (2)

each

R$^{11}$ independently is H, C$_{1-4}$-alkoxy, F, Cl, —SO$_3$H, —COOH, —OH, —CN, —NO$_2$ or C$_{1-4}$-alkyl optionally substituted by —OH, —COOH or —SO$_3$H;

R$^8$ is H, C$_{1-4}$-alkyl or C$_{1-4}$-hydroxyalkyl;

y is 1 to 4; or

—X$^3$L$^2$X$^4$— forms an optionally substituted piperazinylene group.

9. A compound according to claim 6 wherein L$^2$ is C$_{2-10}$-alkylene optionally interrupted by —NR$^8$— wherein R$^8$ is H, C$_{1-4}$-alkyl or C$_{1-4}$-hydroxyalkyl.

10. A compound according to claim 6 wherein

Z$^1$ and Z$^2$ are each independently halogen;

L$^2$ is C$_{2-6}$-alkylene;

X$^3$ and X$^4$ are NH; and

B$^1$ and B$^2$ are —SO$_3$H.

11. A compound according to claim 1 of the Formula (6) and salts thereof:

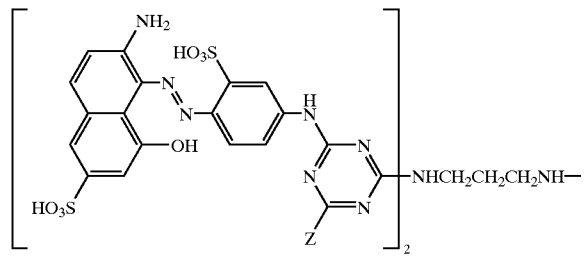

Formula (6)

wherein:

a) both groups represented by Z are —NHCH$_2$CH$_2$OH; or b) both groups represented by Z are Cl; or c) one group represented by Z is Cl and the other is —NHCH$_2$CH$_2$OH.

12. A composition comprising:

(a) from 1 to 99 parts of a compound of the Formula (1) as defined in claim 1, provided that Z$^1$ and Z$^2$ each independently is —SR$^3$, —OR$^4$ or —NR$^5$R$^6$, (b) from 0 to 50 parts of a compound of the Formula (1), provided that one of Z$^1$ is a labile atom or group and the other is —SR$^3$, —OR$^4$ or —NR$^5$R$^6$;

(c) from 99 to 1 parts of a compound of the Formula (1), provided that Z$^1$ and Z$^2$ are each independently a labile atom or group;

wherein R$^3$, R$^4$, R$^5$ and R$^6$ are as defined and all parts are by weight and the total number of parts (a)+(b)+(c)= 100.

13. A composition according to claim 12 wherein:

in component (a) Z$^1$ and Z$^2$ are identical; and in component (c) Z$^1$ and Z$^2$ are identical.

14. A composition according to claim 12 wherein:

in component (a) Z$^1$ and Z$^2$ are identical;

in component (c) Z$^1$ and Z$^2$ are identical and in component (b) Z$^1$ is identical to Z$^1$ and Z$^2$ in component (a) and Z$^2$ is identical to Z$^1$ and Z$^2$ in component (c).

15. A composition according to claim 12 wherein the compounds of Formula (1) are of the Formula (5) as follows:

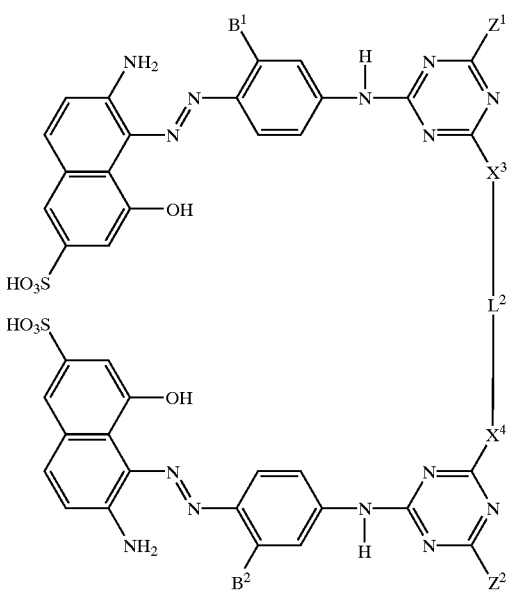

Formula (5)

wherein:
- $B^1$, and $B^2$, are each independently —$SO_3H$, —COOH, —$CF_3$, optionally substituted alkoxy, optionally substituted alkyl or —$PO_3H_2$;
- $Z^1$ and $Z^2$ are each independently —$SR^3$, —$OR^4$, —$NR^5R^6$ or halogen;
- $X^3$ and $X^4$ are each independently an optionally substituted piperazinylene group, —S— or —$NR^7$;
- $R^7$ is H, optionally substituted alkyl or optionally substituted aryl;
- $L^2$ is a group of the Formula (2), or $C_{2\text{-}10}$-alkylene optionally interrupted by —O—, —S—, phenylene, —$NR^8$—, —C(O)—, —CO(O)— or by an optionally substituted piperazinylene group:

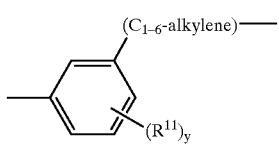

Formula (2)

each
- $R^{11}$ independently is H, $C_{1\text{-}4}$-alkoxy, F, Cl, —$SO_3H$, —COOH, —OH, —CN, —$NO_2$ or $C_{1\text{-}4}$-alkyl optionally substituted by —OH, —COOH or —$SO_3H$;
- $R^8$ is H, $C_{1\text{-}4}$-alkyl or $C_{1\text{-}4}$-hydroxyalkyl;
- y is 1 to 4; or
- —$X^3L^2X^4$— forms an optionally substituted piperazinylene group.

16. A composition comprising:
(a) from 40 to 60 parts of a compound of the Formula (5) or a salt thereof wherein $Z^1$ and $Z^2$ are the same and of the formula —$NHR^{17}$;
(b) from 5 to 45 parts of a compound of the Formula (5) or a salt thereof wherein $Z^1$ is Cl and $Z^2$ is as the same as $Z^2$ in component (a); and
(c) from 10 to 30 parts of a compound of Formula (5) or a salt thereof wherein $Z^1$ and $Z^2$ are Cl;

wherein Formula (5) is as defined in claim 6 in which:
- $B^1$ and $B^2$ are —$SO_3H$;
- $L^2$ is the same in each of components (a), (b) and (c) and is $C_2$-alkylene; $X^3$ and $X^4$ are NH;
- $R^{17}$ is a group of the formula —($C_{1\text{-}4}$alkylene)O($C_{1\text{-}6}$-calkylene)$OR^{19}$ or $C_{1\text{-}6}$-alkyl optionally substituted by $C_{1\text{-}4}$-alkoxy, hydroxy, carboxy, sulpho, tetrahydrofuryl, morpholinyl or a group of the formula —$NR^{19}CO(C_{1\text{-}4}$-alkyl);
- $R^{19}$ is H or $C_{1\text{-}4}$-alkyl; and
all parts are by weight and the sum of the parts (a)+(b)+(c)=100.

17. A composition according to claim 16 wherein:
in component (a) $Z^1$ and $Z^2$ are —$NHCH_2CH_2OH$;
in component (b) $Z^1$ is Cl and $Z^2$ is —$NHCH_2CH_2OH$; and
$L^2$ in each of components (a), (b) and (c) is —$CH_2CH_2CH_2$—.

18. An ink comprising:
(a) from 0.01 to 30 parts in total of one or more compounds according to any one of claims 1, 2, 4, 5, 6, 7, 9, 10 or 11, with the proviso that each of $Z^1$ and $Z^2$ may also be a labile atom or group; and
(b) from 70 to 99.99 parts of a medium comprising a mixture of water and an organic solvent, an organic solvent free from water, or a low melting point solid;
wherein all parts are by weight and the number of parts of (a)+(b)=100.

19. An ink according to claim 18 wherein component (a) is a composition comprising:
(a) from 1 to 99 parts of a compound of the Formula (1),
(b) from 0 to 50 parts of a compound of the Formula (1),
(c) from 99 to 1 parts of a compound of the Formula (1);
wherein all parts are by weight and the total number of parts (a)+(b)+(c)=100, wherein Formula (1) is

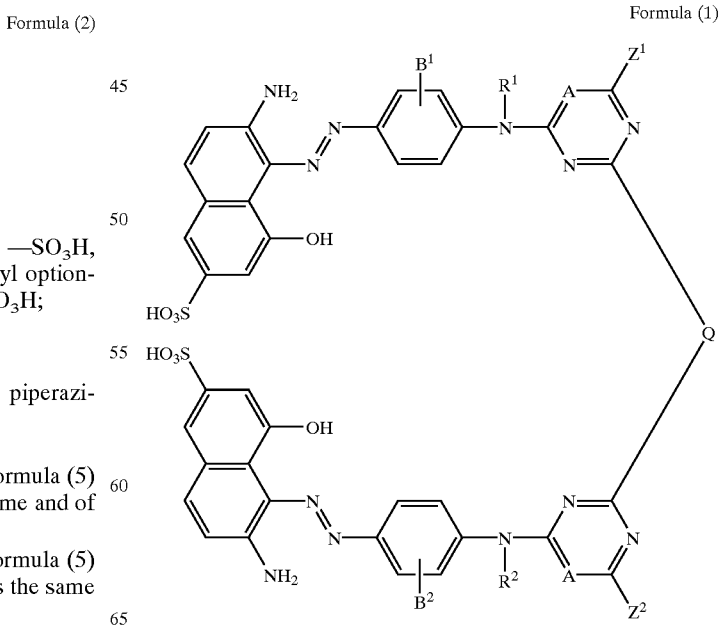

Formula (1)

wherein:

$B^1$ and $B^2$ are each independently —$SO_3H$, —COOH, —$CF_3$, optionally substituted alkoxy, optionally substituted alkyl or —$PO_3H_2$;

Q is an organic linking group;

$R^1$ and $R^2$ are each independently H or optionally substituted alkyl;

each A independently is N, C—Cl, C—CN or C—$NO_2$;

$Z^1$ and $Z^2$ are each independently —$SR^3$, —$OR^4$, —$NR^5R^6$ or halogen;

with the provisos that in (a) $Z^1$ and $Z^2$ each independently are —$SR^3$, —$OR^4$ or —$NR^5R^6$;

in (b) one of $Z^1$ is a labile atom or group and the other is —$SR^3$, —$OR^4$ or —$NR^5R^6$; and, in (c) $Z^1$ and $Z^2$ are each independently a labile atom or group;

$R^3$, $R^4$, $R^5$ & $R^6$ are each independently H, optionally substituted alkyl, optionally substituted aryl or optionally substituted aralkyl; or $R^5$ and $R^6$ together with the nitrogen to which they are attached form an optionally substituted five or six membered ring;

provided that Q is not of the formula:

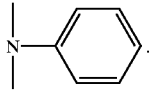

20. A process for printing an image on a substrate comprising applying thereto an ink containing a compound according to any one of claims 1, 2, 4, 5, 6, 7, 9, 10 or 11.

21. A paper, an overhead projector slide or a textile material printed with an ink according to claim 18.

22. An ink jet printer cartridge containing an ink, wherein the ink contains a compound according to any one of claims 1, 4, 5, 6, 7, 9, 10 or 11.

23. An ink according to claim 18 wherein component (a) is a composition comprising (i) from 40 to 60 parts of a compound of the Formula (5) or a salt thereof;

(ii) from 5 to 45 parts of a compound of the Formula (5) or a salt thereof; and (iii) from 10 to 30 parts of a compound of Formula (5) or a salt thereof;

wherein Formula (5) is

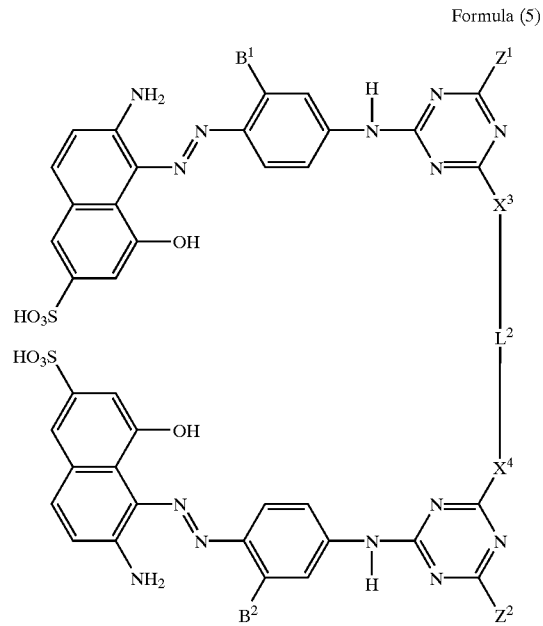

Formula (5)

wherein:

$X^3$ and $X^4$ are each independently an optionally substituted piperazinylene group, —S— or —$NR^7$—;

$R^7$ is H, optionally substituted alkyl or optionally substituted aryl;

$L^1$ is a group of the Formula (2), or $C_{2-10}$-alkylene optionally interrupted by —O—, —S—, phenylene, —$NR^8$—, —C(O)—, —CO(O)— or by an optionally substituted piperazinylene group:

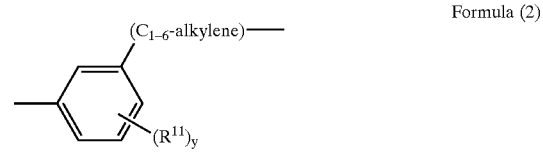

Formula (2)

each $R^{11}$ independently is H, $C_{1-4}$-alkoxy, F, Cl, —$SO_3H$, —COOH, —OH, —CN, —$NO_2$ or $C_{1-4}$-alkyl optionally substituted by —OH, —COOH or —$SO_3H$;

$R^8$ is H, $C_{1-4}$-alkyl or $C_{1-4}$-hydroxyalkyl;

y is 1 to 4; or

—$X^3L^2X^4$— forms an optionally substituted piperazinylene group in which:

$B^1$ and $B^2$ are —$SO_3H$;

$L^2$ is the same in each of components (a), (b) and (c) and is $C_{2-4}$-alkylene;

$X^3$ and $X^4$ are NH;

$R^{17}$ is a group of the formula —($C_{1-6}$-alkylene)O($C_{1-6}$-alkylene)O$R^{19}$ or $C_{1-6}$-alkyl optionally substituted by $C_{1-4}$-alkoxy, hydroxy, carboxy, sulpho, tetrahydrofuryl, morpholinyl or a group of the formula —$NR^{19}CO(C_{1-4}$-alkyl);

$R^{19}$ is H or $C_{1-4}$-alkyl; and wherein in (i) $Z^1$ and $Z^2$ are the same and of the formula —$NHR^{17}$;

wherein in (ii) $Z^1$ is Cl and $Z^2$ is as the same as $Z^2$ in component (i); and wherein in (iii) $Z^1$ and $Z^2$ are Cl, and wherein all parts are by weight and the sum of the parts (a)+(b)+(c)=100.

24. A process for printing an image on a substrate comprising applying thereto an ink containing a composition according to any one of claims 12 to 17.

25. An ink jet printer cartridge containing an ink containing a composition according to any one of claims 12 to 16.

26. A paper, an overhead projector slide or a textile printed by means of the process according to claim 20.

27. A paper, an overhead projector slide or a textile material coated with a compound according to any one of claims 1, 2, 4, 5, 6, 7, 9, 10 or 11.

28. A paper, an overhead projector slide or a textile material coated with a composition according to any one of claims 12 to 16.

* * * * *